March 15, 1938. H. E. HOLLMANN 2,111,396
ULTRASHORT WAVE CIRCUIT
Filed March 8, 1934
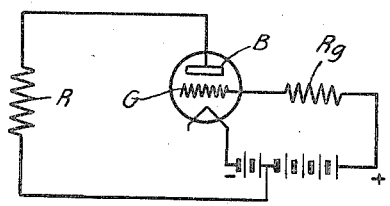
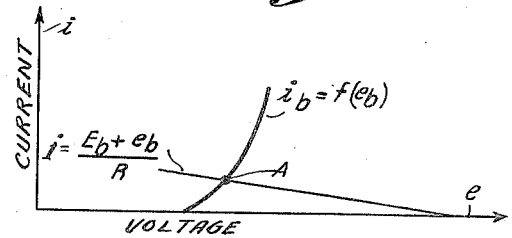
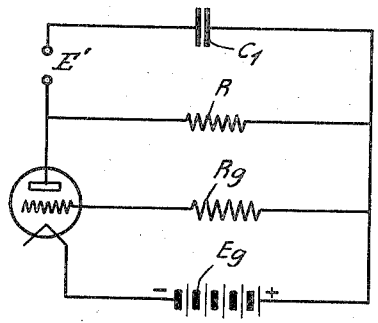
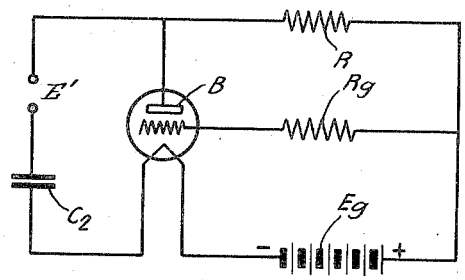
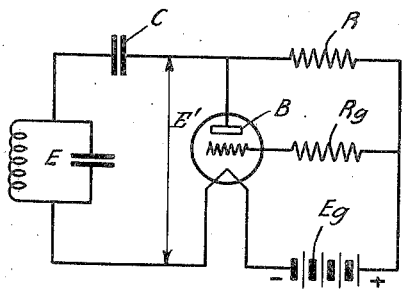
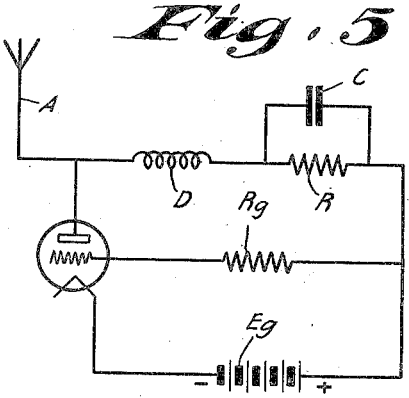
INVENTOR
HANS ERICH HOLLMANN
BY
ATTORNEY Patented Mar. 15, 1938

2,111,396

UNITED STATES PATENT OFFICE 2,111,396

ULTRASHORT WAVE CIRCUIT

Hans Erich Hollmann, Berlin, Germany, assignor to Telefunken Gesellschaft für Drahtlose Telegraphie m. b. H., Berlin, Germany, a corporation of Germany Application March 8, 1934, Serial No. 714,650 In Germany March 8, 1933

4 Claims. (Cl. 250—27)

It is known in the art that a triode tube when connected in a Barkhausen-Kurz short wave (positive grid) circuit arrangement, because of its extremely sharp knee in the anode current-voltage characteristic, may be used as a rectifier of extremely great sensitivity for all frequencies, and that moreover it is excellently suited for the production of extremely high frequencies. What has also been called the "retarding-field" circuit arrangement as here dealt with is the outcome really of a transposition or exchange of the electrode potentials in that a high positive potential is applied to the grid so that it actually plays the part of the anode, whereas the outside electrode, which is here denoted by "retarding" electrode, takes care of the control of the grid current. In order that the best possible results may be obtained with such a tube in whatever circuit schemes may be used therefor, say, as a rectifier in a receiver (retarding-field audion), exact adjustment and maintenance of the retarder potential $e_b$ required in that instance is of utmost importance, $e_b$ being the actual potential on the anode.

Figure 1 illustrates the fundamental features of a circuit arrangement in accordance with the principles of the invention, and Figure 2 is explanatory of the operation of Figure 1. Figures 3a, 3b, 4 and 5 illustrate different embodiments of the invention.

My invention comprises a Barkhausen tube circuit, operating essentially as a detector, wherein the detecting action is optimum for a given value of direct current, and wherein, for assuring this result, the battery $E_b$ and resistance R are provided in series, so that both $E_b$ and R may be increased to a high value for maintaining the ratio of $$\frac{E_b}{R}$$

equal to the desired direct current. My invention is thus useful in controlling the potential of the retarder electrode in such manner that it becomes automatically adjusted to its optimum value. This is accomplished by providing the retarder electrode (anode) B of a Barkhausen-Kurz short wave tube having a load in its grid circuit consisting of any desired resistance at all $R_g$, with a positive biasing voltage source $E_b$ connected by way of a high ohmic resistance R as shown in Figure 1. The working point A shown in Figure 2 is then the intersection between the retarding field tube characteristic $i_b = f(e_b)$ and the resistance line $$i = \frac{E_b + e_b}{R}$$

For practical operation it has been found preferable to make conditions so that the slope of resistance line will be as low as feasible, in other words, to choose the resistance as high as possible because the working point A will then be independent of the size of the biasing voltage $E_b$ to a large extent. Owing to the extremely steep rise of the "retarding" current, i. e., anode current, very high positive biasing voltages $E_b$ will then be necessary in order that the working point may be caused to lie at the point of greatest curvature. According to the invention, there may then be used as retarding bias voltage the high positive grid potential $E_g$ in that the retarder electrode (anode) as shown in Figures 3a and 3b is connected with $E_g$ through the leak resistor R.

If, then, a modulated radio frequency is introduced in the retarding circuit, demodulation will be brought about by virtue of the knee in the characteristic, the rectified current $i_b$, presupposing constant emission, producing an intermittent voltage across the load resistance $R_g$, as is well understood by those skilled in the art. The loading of the retarder circuit by the leak resistance $R_g$, however, occasions, as in any other tube, less steepness of the dynamic characteristic with the result that the rectifier $i_b$ decreases. Indeed, in the presence of resistances R of about $10^6$ ohms as required in the leaking of grid voltage, it drops practically to zero.

Now, this drawback is avoidable according to this invention by short-circuiting the retarder circuit both for the radio frequency energy as well as for the modulation frequency. This may be accomplished most simply by capacitive bridging or shunting. It is immaterial in this connection, fundamentally speaking, whether this short-circuiting capacity, as $C_1$ in Figure 3a, shunts the leak resistance R, or, like $C_2$ in Figure 3b whether it unites the electrode B with the cathode. At all events the consequence is that the resistance R is decisive only for the rest (normal) position of the working point A, while for the alternating input voltages the static characteristic holds good.

In Figures 3a and 3b the control voltage lies in the retarding circuit at the point marked E'. Contradistinct therefrom, Figure 4 shows another embodiment of the basic idea of this invention in that the modulated radio frequency voltage E' originating from the receiving circuit E is fed to the electrode B by way of a blocking capacity C. The retarder potential is again fixed by connecting the retarder electrode (anode) B by way of R to the positive grid potential $E_g$. According to this invention the condenser C should be of such high value that it will act as a short-circuit path both for radio frequency as well as for the modulation frequency, lest there be caused a decrease both of the rectified current $di_b$ and thus also of the output potential across the resistor $R_g$.

Figure 5 finally shows a receiving arrangement for ultrashort waves in which the antenna supplies the control potentials. In order that the radio frequency energy may be prevented from leaking off by way of C, it is advisable to insert a choke coil D which, however, should not offer any appreciable resistance to the modulation frequencies.

Similarly, as in the rectification of a modulated carrier wave, the idea underlying this invention, i. e., of insuring automatic adjustment of the working point of an oscillating electron or Barkhausen-Kurz short wave tube could be utilized also in connection with the amplification of input impulses and in wave generation, the working point being caused to fall in the straight part of the characteristic by suitable selection of $E_b$ and R.

I claim:

1. In combination, an electron discharge device having an anode, a cathode and a grid, a source of potential for rendering said grid highly positive with respect to said cathode, a connection including a load between said source and said grid, resistive means connected to said source of potential for biasing said anode with respect to said cathode, and a circuit including a source of alternating potential in series with a condenser connected between said anode and said cathode.

2. In combination, an electron discharge device having a retarding anode, a cathode and a grid, a source of direct current potential for rendering said grid highly positive with respect to said cathode, a connection including a load between said source and said grid, means including a resistance connected between said anode and a point on said source for rendering said anode slightly positive with respect to said cathode, and a controlling input circuit including a capacitor connected between said cathode and said anode, said capacitor constituting a low impedance to high frequency currents impressed upon said input circuit.

3. In combination, an electron discharge device having a retarding anode, a cathode and a grid, a source of direct current potential for rendering said grid highly positive with respect to said cathode, a connection including a load between said source and said grid, a resistive connection between said source and said anode for impressing a low positive potential upon said anode with respect to said cathode, an antenna coupled to said anode, and a capacitor in shunt with said resistive connection, said capacitor having a low impedance to high frequency currents impressed on said anode from said antenna.

4. In an ultra-short wave radio receiver, an electron discharge tube having a cathode, a plate and a grid, means including a source of direct current potential connected between the cathode and grid for establishing a high positive bias on said grid, means including a tap off said source and connected through a resistor to said plate for establishing a low positive bias on said plate, and an input circuit including a source of high frequency control current connected through a capacitor between said cathode and said plate.

HANS ERICH HOLLMANN.